United States Patent [19]

Widl et al.

[11] 3,810,155

[45] May 7, 1974

[54] METHOD AND APPARATUS FOR CODING A DATA FLOW CARRYING BINARY INFORMATION

[75] Inventors: Walter Herbert Erwin Widl, Bandhagen; Stig Erik Karlsson, Skarholmen, both of Sweden

[73] Assignee: Telefonaktiebolaget LM Ericsson, Stockholm, Sweden

[22] Filed: Jan. 13, 1972

[21] Appl. No.: 217,610

[30] Foreign Application Priority Data

Jan. 26, 1971 Sweden ................................ 875/71

[52] U.S. Cl. ........... 340/347 DD, 325/38 R, 178/66

[51] Int. Cl. ............................................ H04l 3/00

[58] Field of Search..... 340/347 DD, 146.1; 178/66, 178/67, 68, 69; 325/38, 41, 42, 38 R; 235/154

[56] References Cited

UNITED STATES PATENTS

| | | | |
|---|---|---|---|
| 2,700,696 | 1/1955 | Barker | 178/68 UX |
| 3,405,235 | 10/1968 | Carter | 340/146.1 AB |
| 3,631,471 | 12/1971 | Griffiths | 340/347 DD |
| 3,510,576 | 5/1970 | Centanni | 325/38 R |

*Primary Examiner*—Charles D. Miller
*Attorney, Agent, or Firm*—Hane, Baxley & Spiecens

[57] ABSTRACT

The present invention relates to a method of coding a data flow carrying binary information in a local transmission equipment. The data flow comprises two kinds of data signal elements and control signal elements, whereby an optional polarity on the line terminal of the transmission can be selected. The coding method uses four different binary code words 0101, 1010, 0011 and 1100, so that the first kind of the data elements corresponds to one of the code words 0101 or 1010 and the other kind of the code words corresponds to one of the code words 0011 and 1100. One or the other of the code words is selected so that more than two of the code words will not follow one another upon the coding of more than two data elements of the same kind.

8 Claims, 28 Drawing Figures

PRIOR ART

| Code-word sequence | $\alpha \oplus \beta$ | | $\alpha \oplus \gamma$ | | $\partial$ |
|---|---|---|---|---|---|
| A A | 0000 | 0000 | 0110 | 0110 | |
| A B | 0000 | 1111 | 0110 | 1001 | |
| A A′ | 0000 | 0110 | 0110 | 0000 | |
| A B′ | 0000 | 1001 | 0110 | 1111 | |
| B A | 1111 | 0000 | 1001 | 0110 | |
| B B | 1111 | 1111 | 1001 | 1001 | |
| B A′ | 1111 | 0110 | 1001 | 0000 | |
| B B′ | 1111 | 1001 | 1001 | 1111 | |
| A′ A | 0110 | 0000 | 0000 | 0110 | |
| A′ B | 0110 | 1111 | 0000 | 1001 | |
| A′ A′ | 0110 | 0110 | 0000 | 0000 | |
| A′ B′ | 0110 | 1001 | 0000 | 1111 | |
| B′ A | 1001 | 0000 | 1111 | 0110 | |
| B′ B | 1001 | 1111 | 1111 | 1001 | |
| B′ A′ | 1001 | 0110 | 1111 | 0000 | |
| B′ B′ | 1001 | 1001 | 1111 | 1111 | |

Fig. 6a

| Code-word sequence | $\alpha \cdot \beta$ (90°) $\beta$=1010;1010 | | $\alpha \cdot \gamma$ (90°) $\gamma$=1001;1001 | |
|---|---|---|---|---|
| A A | 1111 | 1111 | 1100 | 1100 |
| A B | 1111 | 0000 | 1100 | 0011 |
| A A' | 1111 | 1001 | 1100 | 1010 |
| A B' | 1111 | 0110 | 1100 | 0101 |
| B A | 0000 | 1111 | 0011 | 1100 |
| B B | 0000 | 0000 | 0011 | 0011 |
| B A' | 0000 | 1001 | 0011 | 1010 |
| B B' | 0000 | 0110 | 0011 | 0101 |
| A' A | 1001 | 1111 | 1010 | 1100 |
| A' B | 1001 | 0000 | 1010 | 0011 |
| A' A' | 1001 | 1001 | 1010 | 1010 |
| A' B' | 1001 | 0110 | 1010 | 0101 |
| B' A | 0110 | 1111 | 0101 | 1100 |
| B' B | 0110 | 0000 | 0101 | 0011 |
| B' A' | 0110 | 1001 | 0101 | 1010 |
| B' B' | 0110 | 0110 | 0101 | 0101 |

Fig. 9

METHOD AND APPARATUS FOR CODING A DATA FLOW CARRYING BINARY INFORMATION

The present invention refers to a method of coding a number of data elements carrying information into code words which are adapted to be transmitted in a data transmission equipment for local connections. The invention furthermore refers to a transmitter-receiver equipment in which such coding method is used.

In data transmission techniques, transmission links are provided for long-distance or local connections. For connections of the latter kind, the transmission is carried out by means of physical two-wire connections in which, differently from long-distance connections, no carrier frequency links are needed. This eliminates the necessity of modulation and demodulation and allows the use of special simple and accordingly economical data transmission equipment.

In a previously known equipment for a local connection, incoming data are coded into binary elements which on the transmission line are represented by D.C. pulses. The polarity of these D.C. pulses is selected in such a way that the signal spectrum of the line does not present any D.C. components. Therefore, the data signals can pass transformers so that by means of transformer connections between transmitter-receiver equipment and transmission line D.C. isolation between these units is obtained.

During the previously known transmission, a code is used, comprising four different symbols where each symbol consists of two and four consecutive D.C. pulses respectively. The first symbol consists of a positive polarity followed by a negative polarity ( so-called "SPACE"), the second of a negative polarity followed by a positive polarity (so-called "MARK"), the third of two consecutive positive polarities followed by two consecutive negative polarities and the fourth of two consecutive negative polarities followed by two consecutive positive polarities. During the transmission of a binary data flow only the two first-mentioned symbols, i.e., "MARK" and "SPACE," are fed out, but not the latter symbols. Consequently, the receiving of two consecutive positive or negative polarities indicates a defective signal element.

The disadvantage of this known coding method is that each data message must being with at least one signal element with zero polarity in order to obtain a correct indication of the signal elements MARK and SPACE.

Another disadvantage is that no optional polarity on the transmission medium can be selected since in such a case for example the first-mentioned code word SPACE could be perceived as the second code word MARK and vice versa.

An object of the present invention is to eliminate such disadvantages in a data transmission equipment for local connections by providing a method which has the characteristics defined by the appended claims.

The invention will be described more fully with reference to the accompanying drawings.

FIGS. 2A–2J show diagrammatically clock frequency, code word frequency, the form of the code words delivered on the transmitter side, a transmitting signal, a line signal on the transmitter- and the receiver side with and without reversal of line polarity and the code words on the receiver side without and with reversal of line polarity according to the method of the present invention.

Figure 6B:
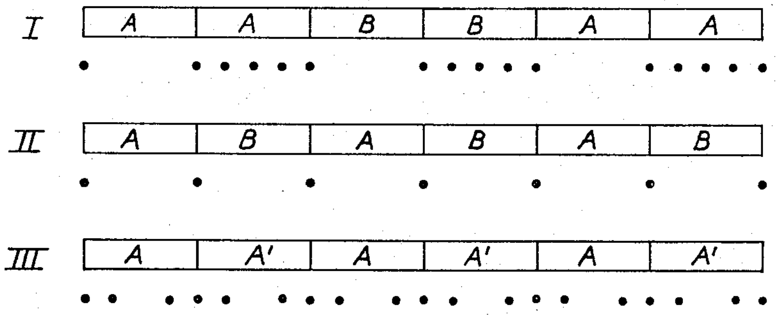

The FIGS. 6*a*, 6*b* show the binary condition of different code word combinations on the receiver side, which serves to explain the mode of operation of the transmitter-receiver equipment according to the invention.

Figure 7:
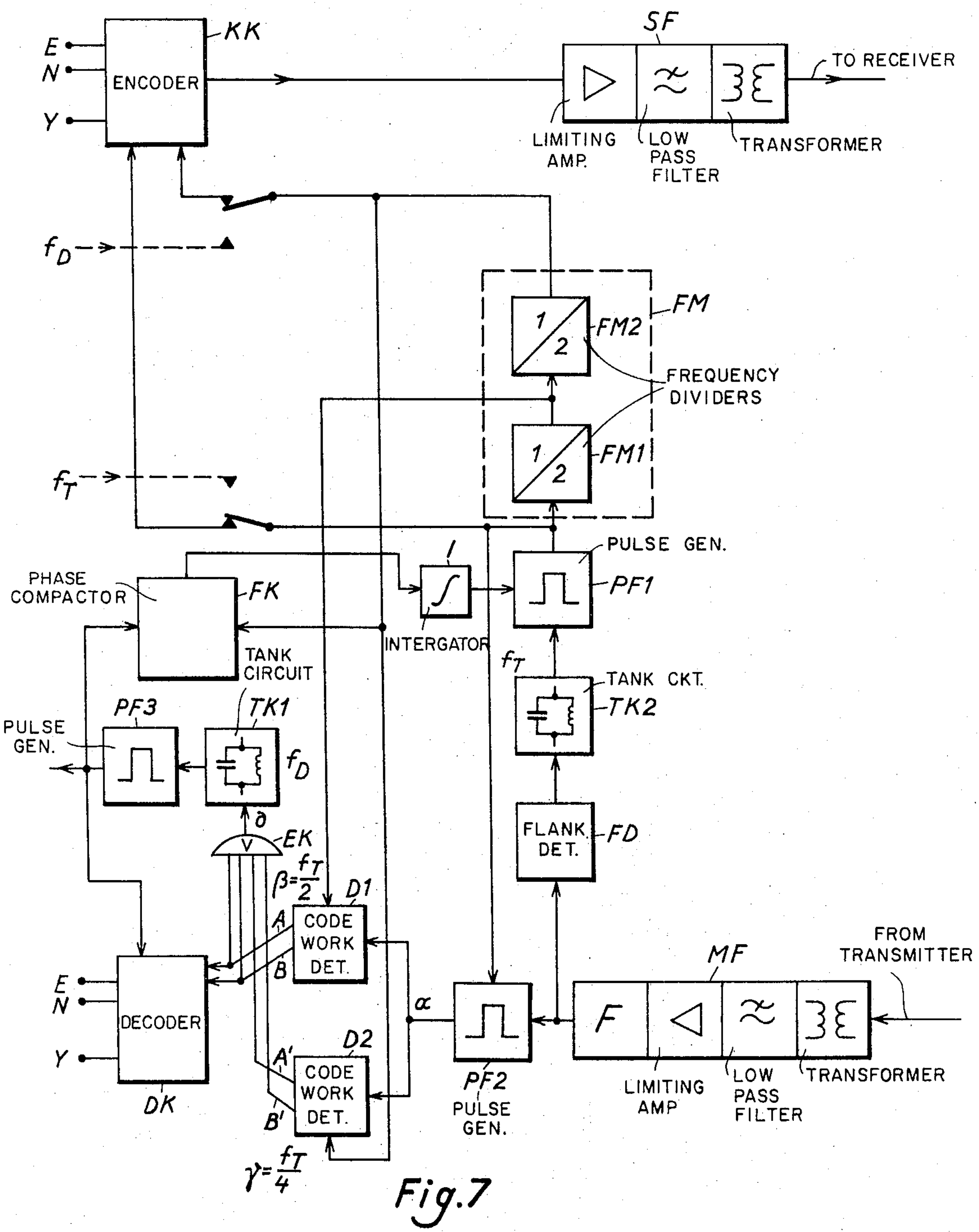

FIG. 7 shows a transmitter-receiver equipment for carrying out the coding method according to the invention.

Figure 8:
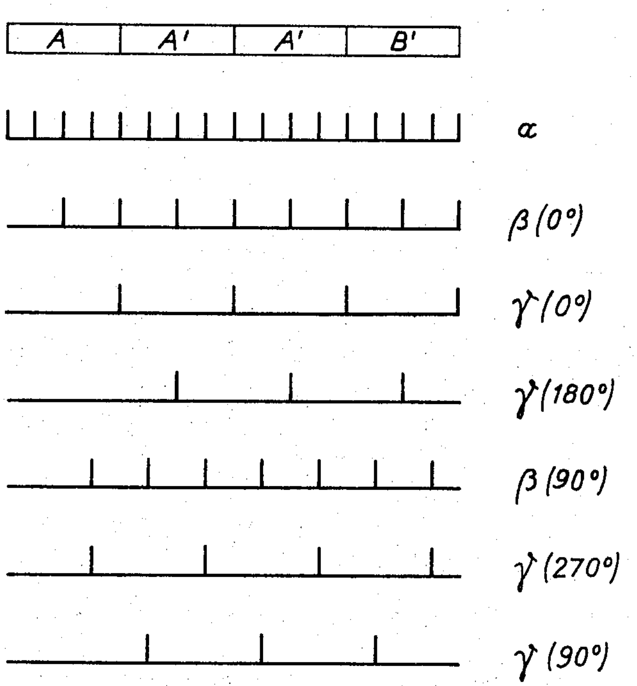

FIG. 8 shows diagrammatically those phase shifts of certain signals which during abnormal operation appear in the device according to FIG. 7.

FIG. 9 shows in correspondence to FIG. 6a the binary state of different code word combinations in the non-normal operations.

Figure 10A:
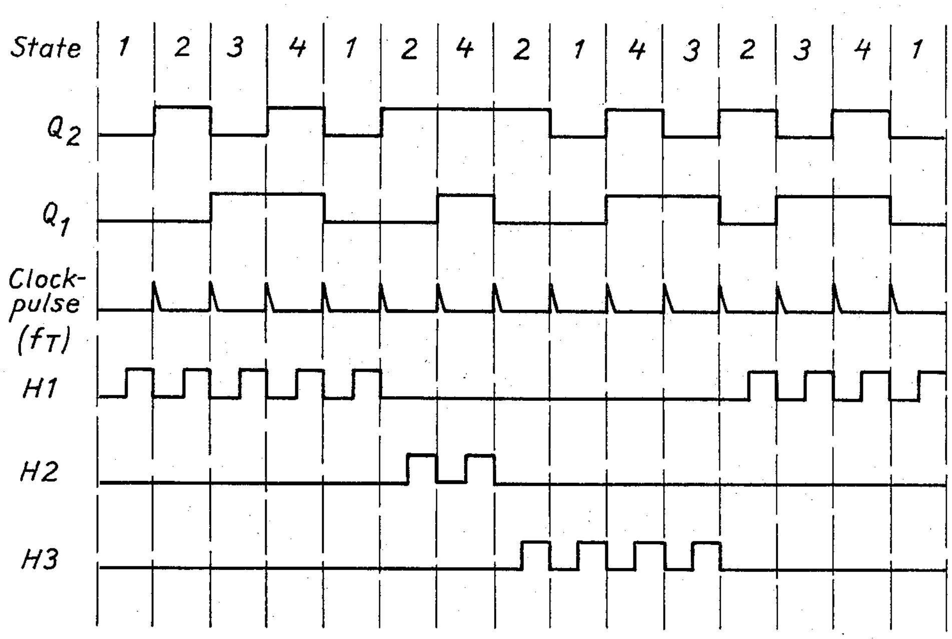

FIGS. 10*a* and *b* show the state diagram and circuit diagram of a binary jump-counter which is included as an essential part in the encoder and the decoder unit according to the invention.

Figure 11:
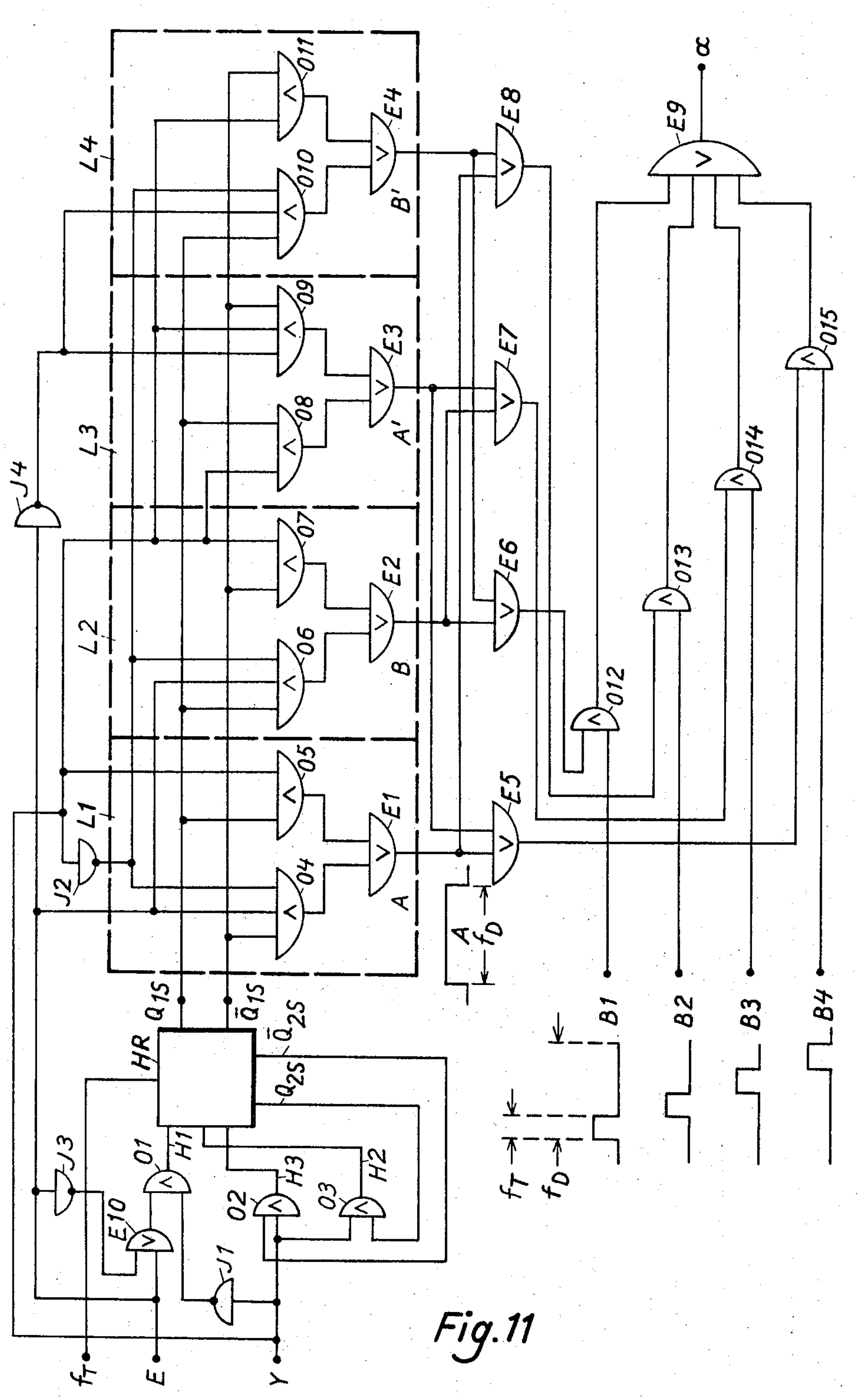

FIG. 11 shows in a logic diagram the principle of the function of the encoder according to the invention.

Figures 12, 13:
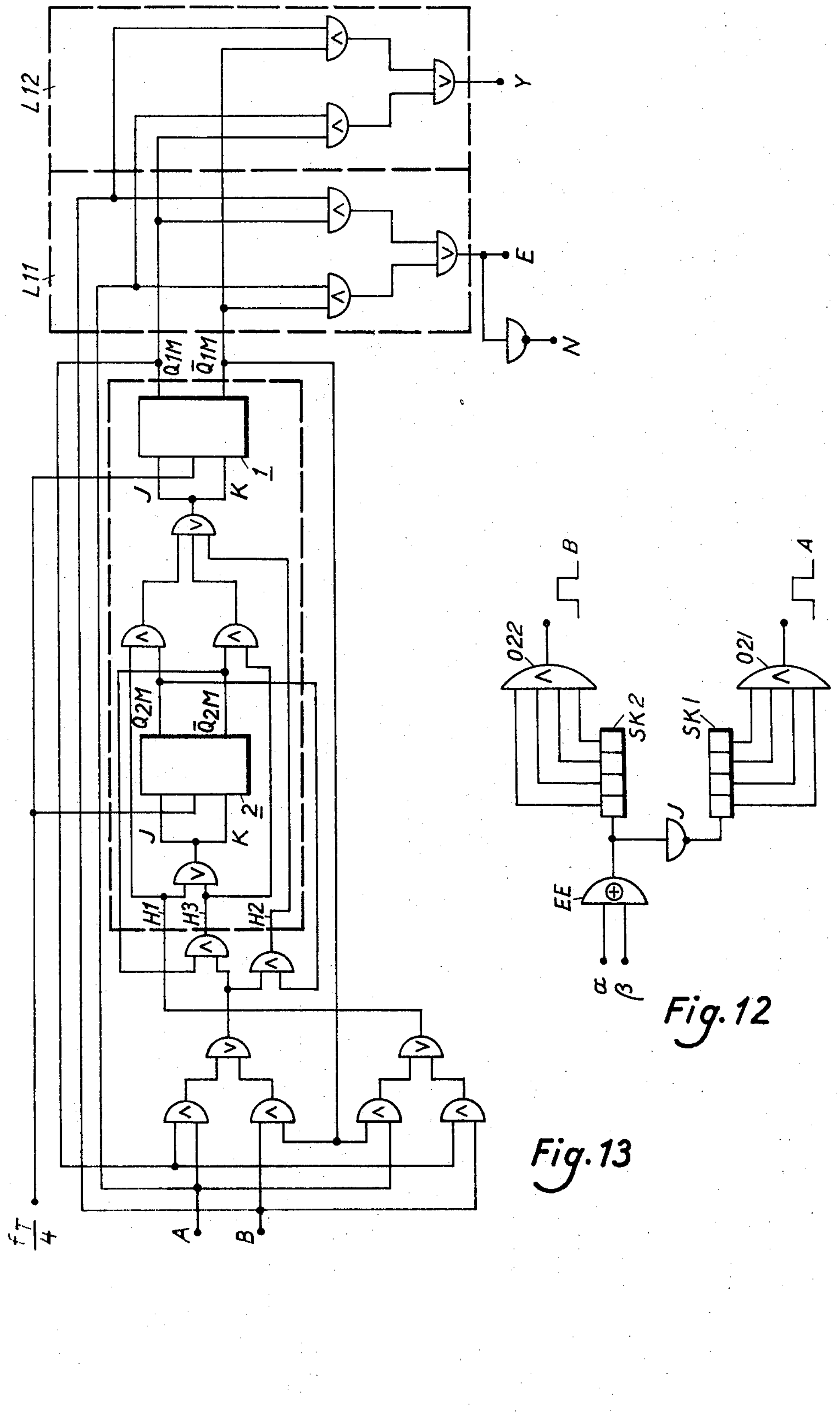

FIG. 12 shows in a logic diagram the fundamental function of a code word detector included in the receiver unit of the equipment according to the invention.

FIG. 13 shows in a logic diagram the principle of the function of the decoder according to the invention.

Figure 1A:
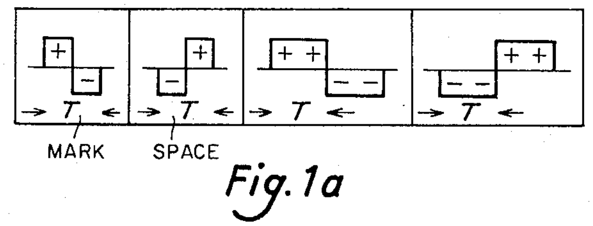
FIGS. 1A, 1B illustrate a coding method that is previously known, and a data transmission equipment of known design.
Figure 1B:
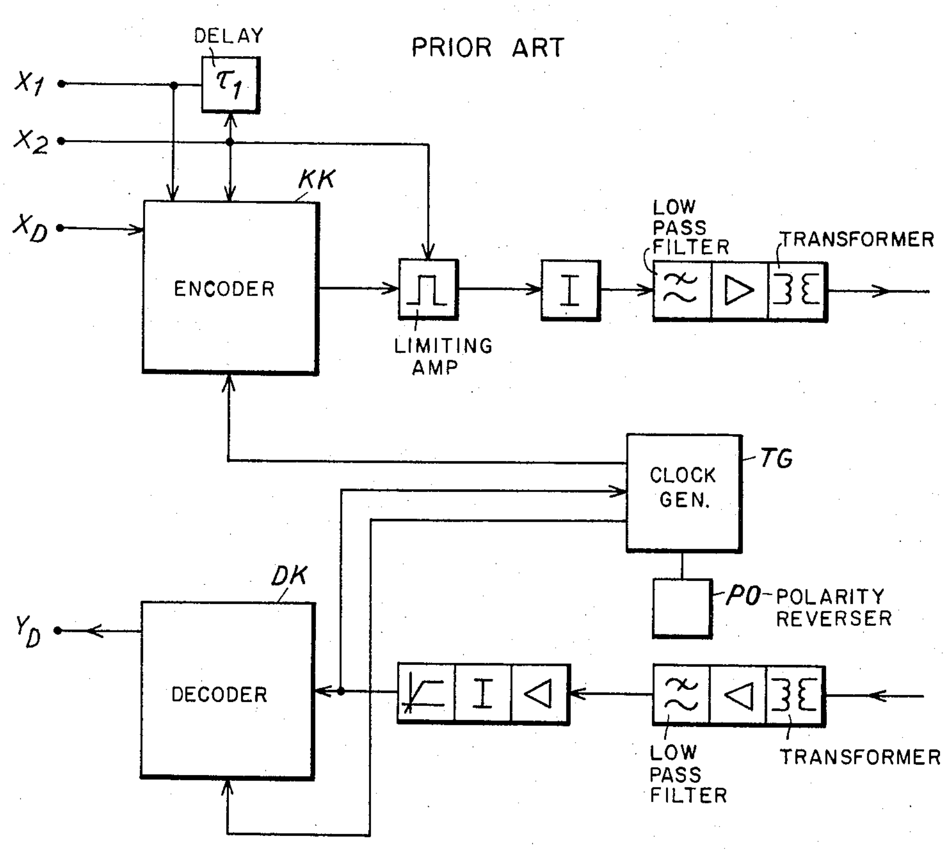

FIGS. 1A and 1B show an example of a previously known code and a transmitter-receiver device in which said code is utilized. The binary data flow $X_D$ fed to the input of the encoder KK is coded into signals consisting of symbols according to FIG. 1A. Thus normally only the two symbols shown to the left in FIG. 1A are fed out from the encoder KK. Of these symbols the first symbolizes a pulse (MARK) and the second and interval (SPACE). Thus on the output of the encoder KK appear alternately positive and negative polarities having a certain clock frequency $f$ where $f = 1/T$ ( see FIG. 1A). In this case when, as it is mentioned above, it is the question of a local connection having a rather short range, no carrier frequency transmission is required and for this reason the clock frequency = the bit frequency. The D.C. pulses are fed via limiting amplifiers, low pass filters and transformers via the line to the intended receiver. The receiver unit of the known device consists of a decoder DK where incoming pulses are decoded so that the original binary data flow is regenerated. The purpose of the clock generator TK is to send on the one hand clock signals to the encoder unit KK in order to control the binary data flow concurrently with incoming data, and on the other hand to deliver a regenerated clock signal to the decoder DK, in order to allow an incoming data flow to be detected correctly. The timing $T$ of the data signal flow is then sensed by the clock generator across a connection to the input of the decoder. Briefly, the operation upon transmission occurs in such a way that on the input $X_2$ a signal is applied for the request of transmission. This is delayed the time $\tau_1$ in the delay circuit and after this the input $X_1$ of the data channel obtains a clear condition and therewith it is allowed to begin sending data through the input $X_D$. These data are coded according to the diagram of FIG. 1A and are fed from the terminal equipment to the line. The time delay is necessary in order to make it possible for the receiver side to become ready for service during which among other things the bit synchronization is established. From the moment when the input $X_2$ has been activated, the clock generator TG delivers a clock signal to the encoder KK, so that a positive pulse is sent out until data signals are beginning to be sent from the terminal equipment of the transmitter. This positive pulse with a duration equal to $\tau_1$ is filtered and amplified in the receiver and is brought to the clock generator TG so that this begins to work according to what has been mentioned above. Besides the clock generator TG, also a polarity controlling device PO is included, the function of which is to reverse the polarity of the line input of the receiving terminal if the incoming line signal has a faulty polarity. At this earlier known equipment it is necessary to inflict the restriction that every data message shall begin with at least one signal element having zero polarity. Furthermore the device has the drawback that if a faulty polarity of the line signal is sent out, the polarity controlling device PO must correct this so as to make it possible for the receiver unit to detect the corresponding code word. This can present difficulties if incorrect polarity often arises in the transmission.

By means of the coding method according to the invention these disadvantages are avoided as it will be explained in connection with the FIGS. 2–9.

Figure 2A:
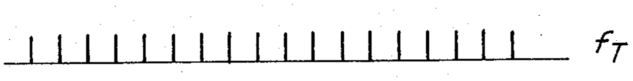
Figure 2B:
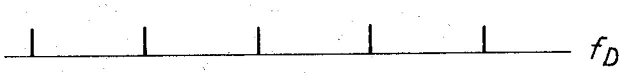
Figure 2C:
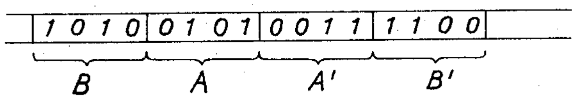
Figure 2D:
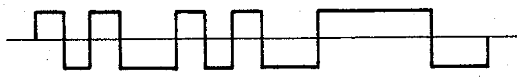
Figure 2E:
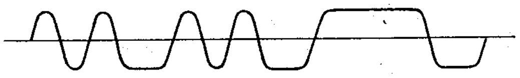
Figure 2F:
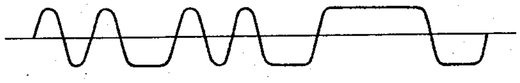
Figure 2G:
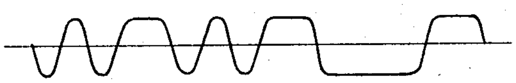
Figure 2H:
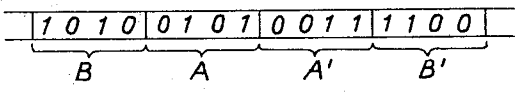
Figure 2J:
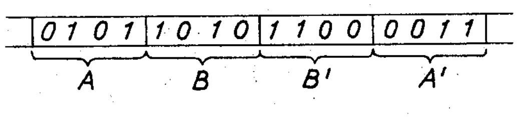

FIG. 2C shows the appearance of four code words indicated by A, B and $A^1$, $B^1$ . Each code word consists of an equal number of binary zeros and ones with a binary one corresponding to a positive D.C. pulse while a binary zero corresponds to a negative D.C. pulse. It is of course possible to select the opposite polarity relation. From the encoder ( which will be described below in connection with FIG. 7) a transmitting signal will be obtained which signal constitutes a binary sequence formed by the four code words A,B and $A^1$ , $B^1$. A binary sequence formed by the code words according to FIG. 2C is shown in FIG. 2D. After passing the terminal equipment which as in the known case comprises a limiting amplifier, a filter unit and a line transformer, a line signal will appear on the transmitter side, see FIG. 2E. In dependence on whether a reversal of the line polarity exists or not, this line signal will be sensed by the receiver side in such a way as it appears from FIGS. 2G and 2F respectively. Thus the transmitted code words A,B, $A^1$ ,$B^1$ will be sensed by the receiver side as A,B-,$AA^1$, $B^1$ , if no reversal of line polarity has occurred ( FIG, 2H), otherwise said code words are perceived as B,A, $B^1$ , $A^1$ (FIG. 2J). However, this will not influence the decoding on the receiver side as will hereinafter be apparent from the description of FIG. 7.

The four binary code words have been selected as A =0101, B= 1010, $A^1$=0011 and $B^1$= 1100 according to what is apparent from FIG. 2C. The binary states 0 and 1 are sent out with the clock frequency $f_T$ according to FIG. 2A and every code word is accordingly sent out with a frequency $f_D$ ( FIG. 2B) which is a fourth of frequently $f_T$. The frequency $f_D$ is hereafter called code word frequency.

Figure 3A:
FIG. 3A shows as an example an arbitrary sequence of data elements, fed to the transmitter side and the figures 3B–E show the possible code word sequences arising therefrom.

FIG. 3A shows an arbitrary sequence of data signal elements E and N which as input magnitudes are applied to the encoder. The magnitudes *E* and *N* represent the item of information "one" and "zero" respectively where *N* is the inverted magnitude of E and vice versa. On the input of the encoder, as it will be described below in connection with FIG. 7, two control signals X and Y can be fed in. However, of these signals only one, Y, will be used henceforth. According to the proposed coding method, the data element E is to be transferred as *A* or *B* and the data element *N* as $A^1$ or $B^1$ in order to become independent of a possible reversal of line polarity. More than two identical code words should not follow each other and the third code word is always replaced by the second alternative of the same signification as it will be explained. Thus the transfer of *E* and *N* is carried out according to the following code rule:

| | |
|---|---|
| E=A | N=$A^1$ |
| EE=AA | NN=$A^1A^1$ |
| EEE=AAB | NNN=$A^1A^1B^1$ |
| EEEE=AABB | NNNN=$A^1A^1B^1B^1$ |
| EEEEE=AABBA | NNNNN=$A^1A^1B^1B^1A^1$ |

Figure 3B:
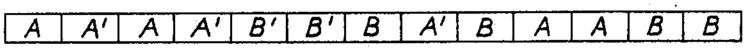
Figure 3C:
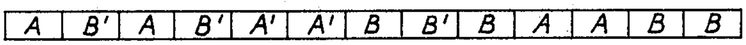
Figure 3D:
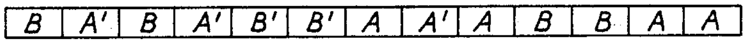
Figure 3E:
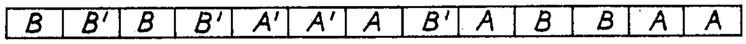
Figure 4:
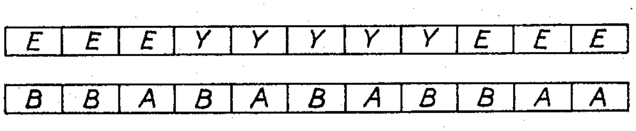
FIG. 4 shows the coding of control signals in the coding procedure according to the invention.

If instead one starts with E = B and N = $B^1$ only A is to be replaced by *B* and $A^1$ by $B^1$ in the preceding table. The used control signal *Y* is transmitted as alternately *A B A B* or *B A B A* in order to avoid mixing up with those code words sequences which correspond to *N* and *E*. The conditions made on *E* and *N* will imply according to what is apparent from FIG. 3 that a certain arbitrary sequence of data signals, shown in FIG. 3A, is transmitted with four alternative code word sequences shown in FIG. 3B–E. In FIG. 3B, *E* = *A* and *N* = $A^1$, in FIG. 3C, *E* = *A* and *N* = $B^1$ , in FIG. 3D, *E* = *B* and *N* = $A^1$ and finally in FIG. 3E, *E* = *B* and *N* = $B^1$. In FIG. 4 one of the two possible code word sequences for *Y* is shown, in that case when *Y* is preceded and is followed by the data element E.

FIG. 7 shows a transmitter-receiver device in which the coding method according to the invention is carried out. In the encoder unit KK a digital coding of the incoming elements E,N,Y occurs with the rate of the frequency $f_D$ and on the transmitter side of the encoder KK a transmitting signal is obtained in accordance with FIG. 2D. This is allowed to pass a unit SF comprising a limiting amplifier, a low pass filter and a line transformer and on the output of the same a line signal is obtained according to FIG. 2E as has been described above.

On the receiver side line signals are obtained which pass the unit MF including a line transformer for D.C. isolation, a low pass filter and a limiting amplifier and the signal thus obtained is fed via a pulse generating stage PF2 into an individual code word detector D1 and D2 where the retrieval of transmitted code words *A*,*B*, $A^1$, $B^1$ is carried out in order to make it possible for such words to be fed to the decoder unit or translating DK on the output of which the signal elements *E*,*N* and *Y* are regenerated. A flank or edge detector FD senses the positive voltage changes of the line signal from the unit MF and activates a tank circuit TK2 which is tuned to oscillate on the frequency $f_T$ ( see FIG. 2A). Thus from the pulse generating stage PF1 a pulse train with the frequency $f_T$ is obtained. This frequency is then divided by two in each of two steps by means of two frequency dividers FM1 and FM2 of a clocking means FM. On the output of the divider FM2 a pulse train with the frequency $f_T/4 = f_D$ is obtained and this train is fed into the encoder unit KK so that a control in accordance with the code word frequency is carried out. Also the clock frequency $f_T$ is fed to the encoder unit KK in order to obtain the correct bit frequency.

Figure 5:
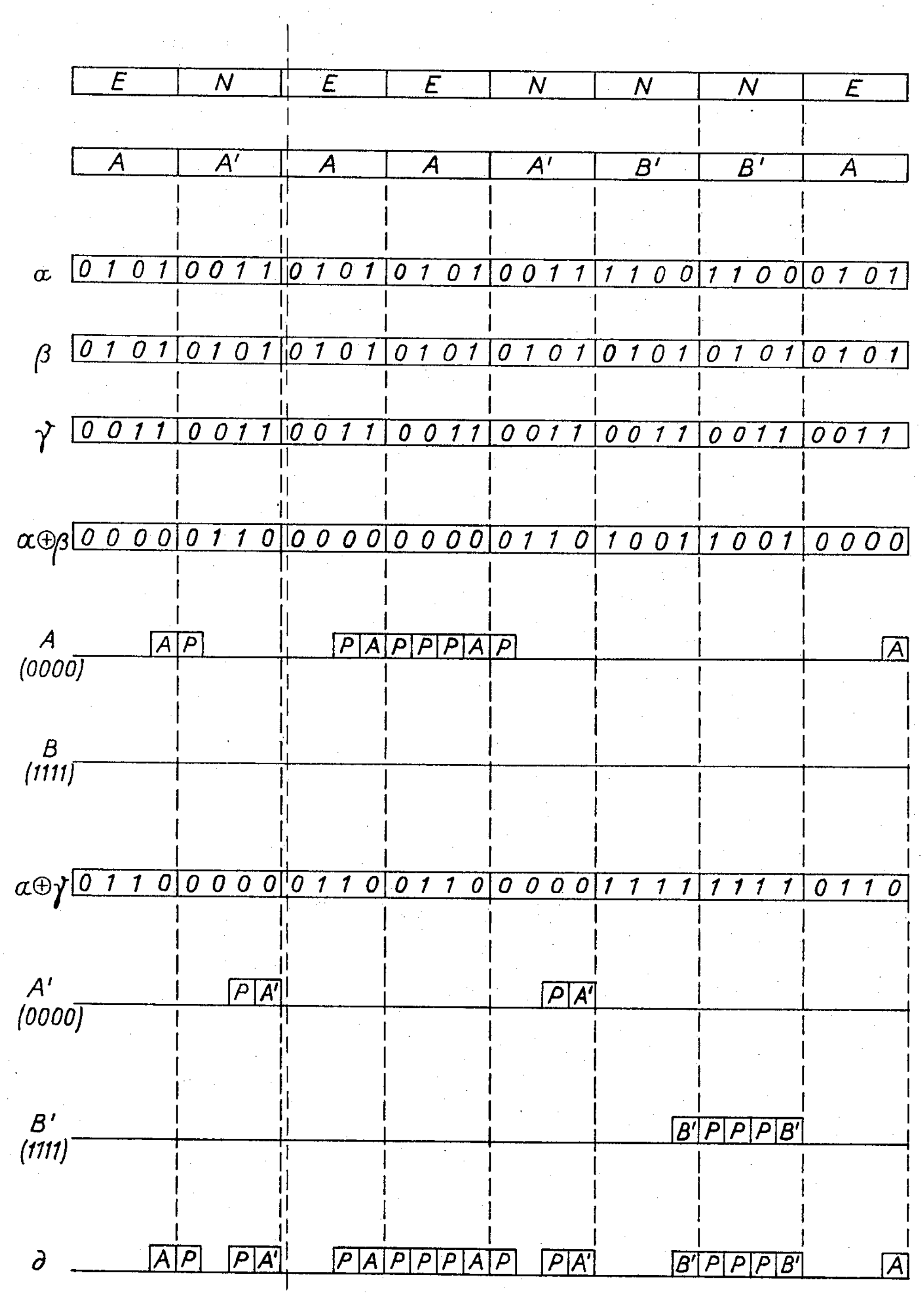
FIG. 5 shows diagrammatically the operation on the receiver side when an arbitrary data- and control signal flow has been fed to the transmitter side.

In connection with FIG. 5 the operation of the decoding will be explained more in detail. As an example an arbitrary flow of data and control elements *E,N . . . ,E,Y,N,N,N,E* is presented which in the encoder unit KK is coded into $A$, $A^1$, . . . ,$A$,$A$,$A^1$,$B^1$,$B^1A$ in accordance with the coding method according to the invention. On a first input to each of the code word detectors D1 and D2 there appears a binary signal flow of code words which in FIG. 5 is indicated by $\alpha$. On a second input of the code word detector D1 a binary signal flow $\beta$ of alternately ones and zeros is fed which flow can be obtained from the output of the frequency divider FM1. On a second input of the code word detector D2 the signal flow from the output of the frequency divider FM2 is fed, the signal flow of which is indicated by $\gamma$ in FIG. 5. In each code word detector an exclusive OR-operation of the quantities $\alpha$, $\beta$ and $\gamma$ is carried out in known manner. The code word detector D1 is then so constructed that it delivers a pulse on its output A, if it has detected four consecutive zeros in $\alpha\oplus\beta$. According to the example in FIG. 5 it will in this case detect the code word $A$, as this code word has been selected to correspond to said four zeros in $\alpha\oplus\beta$. However, the code word detector D1 will also deliver a pulse for the fifth, the sixth and the seventh zero in $\alpha\oplus\beta$ which shall not correspond to any code word $A$, in other words undesirable parasitic pulses $P$ appear on the output A of the code word detector D1. As it will be explained below these will not have injurious effect on the operation of the decoder DK. The second output B of the code word detector D1 will deliver a pulse for each detected code word $B$ since it is constructed in such a way that said pulse is delivered if four consecutive ones in $\alpha\oplus\beta$ have been detected. Also here parasitic pulses can appear, which as in the preceding case have no effect on the operation of the decoder. The code word detector D2 works in the same manner as the code word detector D1. It executes the exclusive OR-operation $\alpha\oplus\beta$ where $\beta$ has been obtained from the output of the frequency divider FM2 and which is represented by a pulse train with the frequency $f_T/4 = f_D$ , i.e., the code word frequency. On the output $A^1$ a pulse is obtained if four consecutive zeros in $\alpha\oplus\beta$ have been detected and on the output $B^1$ a pulse is obtained, if four consecutive ones in $\alpha\oplus\beta$ have been detected. The output from the code word detector D1 is connected to the decoder DK from whose output the signal elements *N,E,Y* are obtained. The quantities of the outputs $A^1$ and $B^1$ of the code word detector D2 need not be decoded since $N = \bar{E}$ . The outputs of the two code word detectors are however connected to the inputs of an OR-circuit EK on the output of which signals are obtained as it appears from line $\beta$ FIG. 5. In FIG. 6*a* the control pulses appearing from the outputs of the code word detectors have been illustrated for all sixteen code word combinations. By a point under an interspace between two binary conditions the back flank of a control pulse is indicated which according to the example in FIG. 5 appears as a pulse on the outputs of the code word detectors, corresponding to a certain code word or an undesirable parasitic pulse. According to what is apparent from FIG. 6*b* the output quantity $\delta$ from the OR-circuit EK will always contain a control pulse, the repeating frequency of which is $f_T/4 = f_D$. This control pulse activates the tank circuit TK1 in FIG. 7 in consequence of which there always appears on the output of the pulse former PF3 upon the transmission and reception of the code words, a pulse train having the correct phase and with the frequency $f_D$. As it is apparent from FIG. 6*b* three characteristic patterns I,II and III of the control pulses are found in certain code word sequences. For an arbitrary sequence of the binary data flow a mixture of the patterns I,II and III appears and a Fourier analysis indicates that each pattern contains spectral components with the frequency $f_D$ in the same phase position but with different amplitude values. Thus the tank circuit TK1 will always be triggered in the same phase independently of the sequence of code words. This is a necessary condition when the pulse train is fed to the decoder DK in order to allow it to decode correctly the output signals $A$,$B$ and $A^1$, $B^1$, respectively, obtained from the code word detectors. In the normal case as it is shown in FIG. 5 and 6*a,b* it is assumed that the clock frequency $f_T$ incoming on the receiver side has the phase shift 0°, i.e., arrives with the right phase position. From FIG. 2F–I it is seen that if a reversal of the line polarity exists, certainly the code words $A$ and $B$ respectively $A^1$ and $B^1$ will be reversed, but this has according to the selected coding method no importance for the decoding since the decoder DK detects both an $A$ and a $B$ as the signal element $E$ where according to the coding method the change in the sequence of *A:s* and *B:s* determines whether an $E$ or a $Y$ is to be detected. As soon as a change in for, example, the sequence of three code words *A B A* or a change in the sequence of three code words *B A B* has been detected by the decoder, this means that three signal elements $Y$ are to be sent out while three signal elements $E$ are sent out if the sequence of three code words *AAB* or *BBA* have been detected.

However, at the start or interruption of the transmitter-receiver equipment the frequency division from the tank circuit TK2 can occur in different phase positions. These phase positions are apparent from FIG. 8. In fact, the following alternatives can arise:

Alt. 1. $f_T/2$ 0° and $f_T/4$ 0°

This is the normal case which is described above in connection with the FIGS. 5 and 6*a,b*.

Alt.2. $f_T/2$ 0° and $f_T/4$ 180°

According to FIG. 8 and the FIGS. 2 and 5, the output signal $A$,$B$ of the code word detector D1 is not affected, since $f_T/2$ is fed in with the correct phase position. That $f_T/4$ is displaced 180° implies that a shift of $A^1$ and $B^1$ occurs on the output of the code word detector D2 but this shift has no importance for the decoding (compare the case with the reversal of line polarity).

Alt.3. $f_T/2$ 90° and $f_T/4$ 900°

This has the result that $A$ and $B$ are shifted on the output of the code word detector D1. On the output of the code word detector D2 faulty code words $A^1$ and $B^1$ appear for each *A-A* and *B-A* transition in the data flow. Furthermore no detecting whatever of the code words $A^1$ and $B^1$ is obtained from the detector D2. See FIG. 9.

Alt.4. $f_T/2$ 90° and $f_T/4$ 270°

This gives the same result with respect to the decoding as alt.3.

Thus in alternatives 3 and 4 faulty pulses are obtained upon shifting between $A$ and $B$ or vice versa. The tank circuit TK1 will however be triggered by the control pulses which are obtained from the output of the code detector D1 (the signal $\alpha \oplus \beta$ where $\beta$ is phase shifted 90°) due to which phase-correct pulses are transmitted from the pulse former PF3 to the decoder DK (compare code word sequence $AB$ and $BA$ in FIG. 9). In order to eliminate those pulses from detector D2 which can give faulty code words $A^1$ and $B^1$, a phase comparator FK has been connected to the outputs of the pulse former PF3 and of the frequency divider FM2. The output of this phase comparator is connected to an integrating circuit I which in its turn is connected to the pulse former PF1. The phase comparator compares the phase position of the phase-correct signal, obtained in the tank circuit TK1 with that one which has been fed to the code word detector D2. Upon the occurrence of different phase positions, a delayed pulse is fed out via the integrator I to change the phase of the pulse train (with the frequency $f_T$) from the pulse former PF1 so that the alternatives 3 and 4 according to the above are changed to alternatives 1 and 2. Due to this also an indication of $A^1$ and $B^1$ is obtained.

If at the beginning only the code words $A^1$ and $B^1$ occur in the data word flow and a phase shift exists according to the alternatives 3 and 4, no indication of these code words will be obtained according to FIG. 9. A square under the corresponding interspace between two binary numbers indicates the pulse which would arise if the code words $A^1$ and $B^1$ has been detected correctly. In this case the tank circuit TK1 will not oscillate since there are no trigger pulses. The phase comparator FK generates in this case control pulses to the frequency divider FM and by means of the integrator circuit I a phase correction will be carried out after a number of such control pulses from the phase comparator whereby a restoring to the alternative 1 or 2 is carried out.

In order to make it possible to explain the operation of the encoder KK and of the decoder DK satisfactorily, a jump counter constructed for this purpose will be described in greater detail. Such a counter is included as an essential part in these units and the operation and the design of such counter are shown in FIGS. 10*a,b*. The jump counter consists of a four-stage binary counter so designed that there is a possibility to jump one, two and three binary steps in dependence on the presence of these different control signals H1,H2 and H3 respectively.

The binary counter is built of two so-called JK-flip-flops (described in, for example, Y. Chu "Digital Computer Design Fundamentals," page 128) which, upon, supplying an one-signal to the $J$-input as well as to the $K$-input, is switched from a one-condition to a zero-condition and vice versa. The flip-flops are stepped forward by means of clock pulses from an outer clock and the jump occurs synchronously with this clock. In FIG. 10*a* the desired condition $Q_2$ and $Q_1$ in the flip-flops 2 and 1 are shown when the three different control signals are supplied. For the control signal H1 a change of state takes place for each clock pulse of flip-flop 2 and for every second clock pulse of flip-flop 1. For the control signal $H_2$ no change of state occurs in flip-flop 2, on the contrary, a change of state occurs for each clock pulse of flip-flop 1, i.e., upon the presence of the control pulse H2 when the counter is in state 2 ($Q_2 = 1$ $Q_1 = 0$) the state of the counter will be changed from 2 to 4. If the state of the counter had been 1 ($Q_2 = 0$, $Q_1 = 0$) the state will be changed to 3 for the control signal H2. For the control signal H3 the flip-flop 2 changes its state for each clock pulse and for every second clock pulse in the flip-flop 1 in the same way as for the control signal H1 but the state of the whole counter is changed three steps, i.e., when the counter is in state 2 ($Q_2 = 1$, $Q_1 = 0$) the state of the counter will be changed from 2 to 1 ($Q_2 = 0$, $Q_1 = 0$). If the state of the counter had been 1 ($Q_2 = 0$, $Q_1 = 0$) the state will be changed to 4 ($Q_2 = 1$, $Q_1 = 1$) for the control signal H3. This gives the logical conditions:

$Q_2$ changes sign if and only if $[H1 = 1]$ or $[H3 = 1]$ $Q_1$ changes sign if and only if $[H2 = 1]$ or $[(Q_2 = 0)$ and $(H3=1)]$ or $[(Q_2 = 1)$ and $(H1 = 1)]$.

Figure 10B:
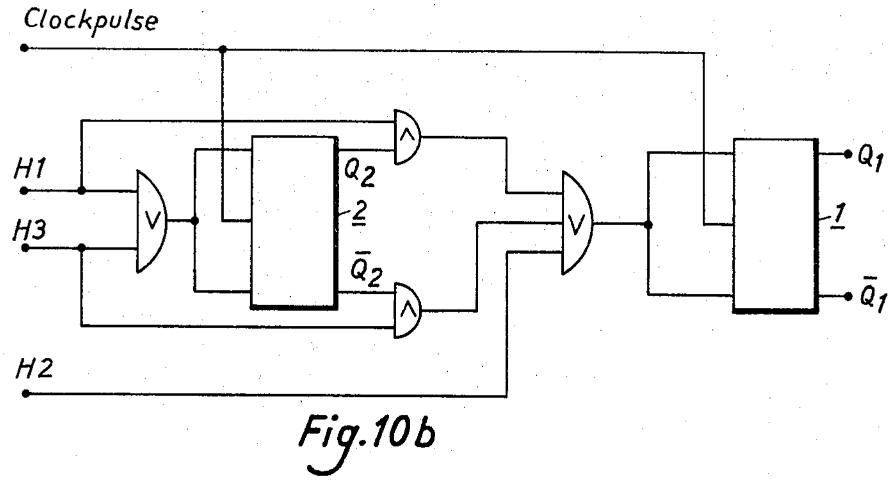

With the aid of these conditions the jump counter is constructed by means of AND-, OR-circuits and two JK-flip-flops as it appears from FIG. 10*b*.

FIG. 11 shows a logic diagram from which the principles of the function of the encoder on the transmitter side appear. The encoder includes a counter HR according to FIG. 10*b* and four logic circuits L1,L2,L3 and L4 each of which generates an output signal, on the one hand in dependence on the state of the counter and on the other hand in dependence on the signal fed to the encoder and intended for transmission. The output signals from the logic circuits L1, L2,L3,L4 are utilized to form the code words which consist of four bits by combining the outputs of the logic circuits with four bit pulses B1,B2,B3,B4 appearing during a clock pulse interval as it will be described more in detail below.

At first it is assumed for the sake of simplicity that the signal E is fed to the input of the encoder. Then Y = O as previously stated. This implies that on the outputs $Q_{1S}$, $\overline{Q}_{1S}$ a one will appear twice followed by two zeros. If for example a one appears on the output $Q_{1S}$ only the output $B$ of the logic circuit L2 will be activated. Consequently a one is obtained during the first bit from the AND-circuit 012 to the output of the OR-circuit E9. During the second bit pulse B2 a zero is obtained from the AND-circuit 013 to the output of the OR-circuit E9, during the third bit pulse B3 a one is obtained from the AND-circuit 014 to the output of the OR-circuit E9 while a zero is obtained from the AND-circuit 015 to the output of the OR-circuit. In this way the code word $B = 1010$ is sent out. If, during the next clock pulse, no change of state occurs in the counter HR the same code word will be sent out. According to the fundamental conditions, the same code word may be sent out only twice in succession. This is secured by the fact that normally a change of state takes place in the counter HR at the latest after two clock pulses. Thus if a change of state has occurred, a one will be obtained on the output $\overline{Q}_{1S}$ which implies that the output A of the L1 circuit is activated. Due to this the bits 0101 are sent out as it is easy to see from the logic diagram.

If it is assumed that the signal $Y$ is to be transmitted, this implies that the signal $E$ (and $N$) on the first input of the encoder shall be suppressed, which implies that the control signal H1 to the counter HR ceases and either of the control signals H2 or H3 appears. The transmission of the $Y$ signal occurs in such a way that the code words appear in another pattern, and, instead of sending out two identical code words sequentially, a change will occur after each code word. In order to achieve this the counter must upon obtaining a $Y$-signal carry out a jump as has been explained in connection with FIG. 10*a* and the purpose of which will now be illustrated.

It is now assumed that the signal Y is to be sent out. Upon the appearance of the signal $Y$, the AND-circuit 01 is blocked and the control signal $H1$ ceases. Which one of the control signals H2 or H3 that appears is dependent on the state of the counter HR. If the counter is in the state 1 (FIG. 10*a*) then $Q_{2S} = 0$ and $Q_{1S} = 0$ (the code word $A$ has been sent out), and the control signal H3 appears on the output of the AND-circuit 02 which implies that the counter jumps to the state 4, i.e. $Q_{2S} = 1$, $Q_{1S} = 1$ and the code word $B$ is sent out. During the next clock pulse the AND-circuit 03 ($Q_{2S} = 1$) is activated and the control signal H2 appears. The counter is in the state 4 but jumps hereby to the state 2, i.e. $Q_{2S} = 1$, $Q_{1S} = 0$ so that now the logic circuit L1 is activated and the code word A is sent out. Thereafter only the state 2 or 4 arises in the counter ($Q_{2S} = 1$).

If the counter upon the appearance of the signal $Y$ is in the state 2 only the control signal H2 will be present and the counter will assume only the states 2 and 4.

Thus it will be evident that the sending of the $Y$ signal implies an immediate conversion from a pattern containing two identical consecutive code words into a pattern in which a change occurs during each clock period. This will be used in order to recognize the different signals on the receiver side as it will be evident from the description of the decoder.

In the above it has been assumed that $E = 1$ and $N = 0$. If $E = 0$ and thus $N = 1$ the code words $A^1$ or $B^1$ are to be obtained according to the assumptions. This is executed by obtaining on the output of an inverting gate J3, a one signal when $E = 0$. This one signal is fed to the OR-gate E10 so that the jump signal H1 is applied to the input of the counter. This one signal represents $N$ and is therefore fed also to the logic circuits L3 and L4 via the inverting gate J4 and the conversion into the code words $A^1$ and $B^1$ is carried out principally in the same manner as in the case $E = 1$.

The line signal $\alpha$ is fed to two code word detectors D1 and D2 (FIG. 7). In the code word detector D1 a logic multiplication is carried out by half the bit frequency of the pulse train $\beta$. In the code word detector D2 a logic multiplication is carried out by the fourth of the bit frequency of the pulse sequence $\gamma$. By the logic multiplication, carried out by means of an exclusive OR-operation, an output signal will be obtained on either the outputs $A$,$B$ or $A^1$, $B^1$ of the code word detectors D1,D2. FIG. 12 is a logic diagram showing the fundamental function of a code word detector, for example D1. To the two inputs of an exclusive OR-gate EE the $\gamma$ and the $\beta$ signal respectively are fed. On the output of the gate EE an output signal is obtained consisting of four consecutive zeros if the code word A is to be detected (exclusive OR-operation between $\alpha$ = 0101 and $\beta$ = 0101) and four consecutive ones if the code word B is to be detected (exclusive OR-operation between $\alpha$ = 1010 and $\beta$ = 0101). The output signal from the gate EE is on the one hand fed via an inverter J to a first shift register SK1 and on the other hand directly to a second shift register SK2. The shift registers SK1, SK2 are stepped forward one step for each of their one-signals obtained on the respective input from the output of the inverter J and from the output of the gate EE, respectively. When four ones have been registered in the shift register SK2, the AND-circuit 022 is activated, on the output of which a one will be obtained as an indication that the code word $B$ has been obtained. When four ones have been registered in the shift register SK1, the AND-circuit 021 will be activated, on the output of which a one is obtained as an indication that the code word A has been received. In a corresponding manner a one is obtained on one of two outputs of the code word detector D2 when the code word $B^1$ and $A^1$ respectively has been detected.

FIG. 13 shows a logic diagram where the functional principle of the decoder DK on the receiver side is shown. The decoder comprises a counter HR according to FIG. 10*b* and two logic circuits L11 and L12 each of which generates an individual output signal, on the one hand in dependence on the condition of the counter HR, on the other hand in dependence on the $A$ or $B$ pulse fed to the decoder from the code word detector D1. These pulses arrive during a time corresponding to the bit frequency $f_T$ and in synchronism with clock pulses obtained from the tank circuit TK1 with its associated pulse former PF3, compare FIG. 7. The output signals from the logic circuits L11 and L12 give the transmitted signals E, N and Y.

In the operation of the decoder, the state $Q_{1M}$ of the flip-flop 1 in the counter of the decoder will be in exact conformity with the state $Q_{1S}$ of the flip-flop 1 in the counter of the encoder unit which will be explained more in detail below. In the transmitter case it has been assumed that a one appears on the output $Q_{1S}$ when an E has been fed to the encoder and for this reason $Q_{1M} = 1$. This will give a code word $B$ as a line signal. If a further $E$ is fed to the transmitter side, then $Q_{1S}$ and $Q_{1M}$ are unchanged and a second code word $B$ is fed out from the encoder for which reason a further $E$ is obtained on the output of the logic circuit L11 of the decoder in FIG. 13. The counter has now changed its state so that $Q_{1M} = 0$ and the decoder expects an $A$ to be fed to its input. If this $A$ is sent out from the encoder unit, an $E$ is consequently obtained on the output of the logic circuit L11. If the opposite relation existed, namely that $Q_{1S}$ from the beginning was in position 0, an $A$ had been fed out from the encoder unit. According to the assumption also the jump counter of the receiver is in such a position that $Q_{1M} = 0$ implying that the receiver expects an $A$, an $E$ being fed out when this second $A$ arrives. After two code words $A$ have arrived, the jump counter of the receiver (like that of the transmitter) changes its condition so that $Q_{1M} = 1$, the receiver expecting a $B$. If this $B$ arrives, an $E$ will be fed out again. As it easily will be seen, control signal H1 has been applied to the jump counter of the receiver during this procedure. Thus the logic condition of the signal H1 on the receiver side will be:

$$H1 = [(A = 1) \text{ and } (Q_{1M} = 0)] \text{ or } [(B = 1) \text{ and } (Q_{1M} = 1)]. \quad (1)$$

It is now assumed that two code words $B$ have been sent out from the transmitter, the jump counter of the receiver (like that one of the transmitter) having changed its condition so that $Q_{1M} = 0$. According to what has been mentioned above the receiver expects an A. If instead a third $B$ arrives, this means that the logic circuit L11 is not activated whereas the logic circuit L12 will be activated and a $Y$ is fed out from the decoder. If, as it has been assumed, $Q_{1M}=0$ and in the case $Q_{2M}=0$, the jump counter of the decoder must be stepped forward three steps during the third code word $B$ so as to made this have the appropriate state before the next code word, i.e., the control signal H3 is to be fed in. If $Q_{2M}=1$, the counter is instead to be stepped forward two steps, i.e., the control signal H2 shall be fed to the jump counter of the receiver. This occurs during the time interval when the third code word has been fed in. If thus a fourth $B$ has been fed in, the counter has occupied the condition $Q_{1M}=1$, $Q_{2M}=1$ and an $E$ is obtained on the output of the decoder in accordance with the fundamental conditions. If, on the contrary, $Q_{2M}=1$ and $Q_{31\ 1M}=1$ during the third code word $B$ and a fourth $B$ is fed in, the two stages of the counter will be stepped forward two steps, i.e., $Q_{2M}=0$ and $Q_{1M}=1$ and for this reason an E is obtained on the output of the logic circuit L11 according to the fundamental conditions. Thus for the control signals H2 and H3 to the jump counter of the decoder the following is valid:

$$(H2=1) \text{ if and only if } [Q_{2M}=1] \text{ and } [(B=1) \text{ and } (Q_{1M}=0) \text{ or } (A=1) \text{ and } (Q_{1M}=0)] \quad (2)$$

$$(H3=1) \text{ if and only if } [Q_{2M}=0] \text{and } [(B=1) \text{ and } (Q_{1M}=0) \text{ or } (A=1) \text{ and } (Q_{1M}=0)] \quad (3)$$

The same logic conditions can be proved to be valid if from the beginning the conditions of the counters are such that $Q_{1S}=Q_{1M}=0$ and two consecutive $A$ were fed out from the encoder unit. The conditions for the control signals will be exactly the same since the same change in the code words appears in transmitter and receiver as in the case when two consecutive B were fed to the encoder. Those logic circuits which correspond to the equations (1) (2) and (3) are shown on the left part of FIG. 13 (the circuits before the jump counter HR).

With the aid of the tables below the synchronism between the counters in the encoder- and the decoder units will be explained assuming that $Q_{1S}=Q_{1M}$.

TABLE 1 (The encoder)

| $Q_{2S}$ | $Q_{1S}$ | E=1(Y=0) Y=1 | | | | |
|---|---|---|---|---|---|---|
| | | + $Q_{2S}$ | + $Q_{1S}$ | + $Q_{2S}$ | + $Q_{1S}$ | |
| 0 | 0 | 1 | 0 (A) | 1 | 1 | (B) |
| 1 | 0 | 0 | 1 (A) | 1 | 1 | (B) |
| 0 | 1 | 1 | 1 (B) | 1 | 0 | (A) |
| 1 | 1 | 0 | 0 (B) | 1 | 0 | (A) |

TABLE 2 (The decoder)

| $Q_{2M}$ | $Q_{1M}$ | A | | B | | |
|---|---|---|---|---|---|---|
| | | + $Q_{2M}$ | + $Q_{1M}$ | + $Q_{2M}$ | + $Q_{1M}$ | |
| 0 | 0 | 1 | 0 (E) | 1 | 1 | (Y) |
| 1 | 0 | 0 | 1 (E) | 1 | 1 | (Y) |
| 0 | 1 | 1 | 0 (Y) | 1 | 1 | (E) |
| 1 | 1 | 1 | 0 (Y) | 0 | 0 | (E) |

In the left column of tables 1 and 2 are shown the four possible states of the jump counter in the encoder and in the decoder, in the middle column the changed state (marked by +) in the jump counter of the encoder unit (table 1) and in the jump counter of the decoder unit (table 2) when an $E=1$ $(Y=0)$ has been applied to the encoder and when an $A$ appears on the output of the decoder respectively. The right hand column in tables 1 and 2 shows the states when $Y=1$ $(E=0)$ has been applied to the encoder (table 1) and when a B appears on the input of the decoder (table 2), respectively.

If upon starting, $Q_{2S}=Q_{1S}=0$ and $Q_{2M}=Q_{1M}=1$ and $Y=1$, then $Q_{2S}=Q_{1S}=1$ and a $B$ is sent out. This gives erroneously an $E$ from the decoder simultaneously as its jump counter changes state so that $Q_{2M}=Q_{1M}=0$. If the next signal element is $Y$, the jump counter of the encoder changes its state so that $Q_{2S}=1$, $Q_{1S}=0$ and an A is sent out. If $Q_{2M}=Q_{1M}=0$ and the code word is $A$ then an erroneous $E$ is again delivered from the decoder and the jump counter changes its state so that $Q_{2M}=1$, $Q_{1M}=0$. The next supplied code word is however detected correctly by the decoder since the jump counters now are in synchronism ($Q_{2S}=Q_{2M}$ and $Q_{1S}=Q_{1M}$). In a similar manner it can be seen from tables 1 and 2 that synchronism is achieved after a number of code words have been sent out for other supplied signal elements $E$ or $Y$.

We claim:

1. Binary data transmission apparatus comprising: a transmitter having an input adapted to receive a serial block of binary data wherein the bits of binary data are represented by first and second elements, said transmitter further comprising an encoder means for converting each of said bits to one of four code words, means for generating one of the two first complementary binary code words 0101 and 1010 when a said first binary data element is received, means for determining if two identical code words have been successively generated in response to the receipt of two successive identical binary elements for determining binary code words is selected being a function of the previously means for generating one of the two second complementary binary code words 0011 and 1100 when a said second binary element is received said means for determining further determining, which of said two second complementary binary code words is generated as a function of the previously received data elements an output means for transmitting a signal having a first or a second state in accordance with the occurrence of a first or second bit, respectively, in the binary code word generated by said encoder means; a transmission link having one end connected to the output of said transmitter and a second end; a receiver having an input connected to the other end of said transmission link for serially receiving the signals representing bits of the binary code words, and converting the signals to pulses, said receiver further comprising a clocking means for generating pulses related to the frequency of the received bits, and a decoder means responsive to the pulses generated by said clocking means and the pulses from the input of said receiver for converting the received binary code words to binary data elements.

2. The binary data transmission apparatus of claim 1 wherein said clocking means generates a series of pulses having a frequency which is a $2^{-n}$ times the frequency of the received bits and said decoder means comprises a code word detector having a first input connected to said clocking means for serially receiving the series of pulses generated thereby, a second input connected to the input of said receiver, and an output, said code word detector including logic means for performing an EXCLUSIVE-OR operation on the pulses received at said inputs for transmitting to said output signals representing binary 1s and 0s in accordance with the results of said operation, and said decoder means further comprises a translating means connected to the output of said code word detector for generating representations of the first and second binary data elements in accordance with the sequence of signals generated by said code word detector.

3. The binary data transmission apparatus of claim 2 wherein said translating means includes means for generating a representation of one of said binary data elements upon receipt of signals representing four sequential binary 1s and a representation of the other of said binary data elements upon receipt of signals representing four sequential binary 0s.

4. The binary data transmission apparatus of claim 1 wherein said clocking means comprises first and second pulse generating means for generating, respectively, first and second series of pulses having a frequency which are, respectively, one-half and one-quarter the frequency of the received bits, and said decoder means comprises first and second code word detectors each having first and second inputs and outputs and each including logic means for performing EXCLUSIVE-OR operations on pulses received at their associated first and second inputs for transmitting from their associated outputs signals representing binary 1s and 0s in accordance with the results of said operations and translating means connected to the output of at least one of said code word detectors for generating representations of the first and second binary data elements in accordance with the sequence of signals generated by said code word detector.

5. The binary data transmission apparatus of claim 4 further comprising OR-circuit means having inputs connected to the outputs of said code word detectors and an output, a resonant circuit means having an input connected to the output of said OR-circuit means and having a resonant frequency equal to one-quarter of frequency of the received bits for generating timing pulses and having an output connected to said translating means for synchronizing the operation thereof to the times of reception of the binary code words.

6. The binary data transmission apparatus of claim 5 wherein said translating means includes means for generating a representation of one of said binary data elements upon receipt of signals representing four sequential binary 1s and a representation of the other of said binary data elements upon receipt of signals representing four sequential binary 0s.

7. The binary data transmission apparatus of claim 5 wherein said clocking means is controllable with respect to the phasing of the generated pulses and further comprising a phase comparison means having a first input connected to the output of said resonant circuit means, a second input connected to the output of said second pulse generating means of said clocking means, and an output for generating a signal representing the difference in phase of the signals received at the inputs thereof, an integrator means having an input connected to the output of said phase comparison means and an output for transmitting a signal to said clocking means for controlling the generation of the pulse signals thereby so as to minimize the difference in the phase of signals received at the inputs of said phase comparison means.

8. The binary data transmission apparatus of claim 7 wherein said clocking means further comprises at its input a further resonant circuit means and a controllable pulse former, said controllable pulse former being controlled by the signal of said integrator means.

* * * * *